(12) United States Patent
Sawayda et al.

(10) Patent No.: US 8,506,661 B2
(45) Date of Patent: Aug. 13, 2013

(54) POLISHING SLURRY FOR COPPER FILMS

(75) Inventors: Rebecca A. Sawayda, Gilbert, AZ (US); Bentley J. Palmer, Phoenix, AZ (US)

(73) Assignee: Air Products & Chemicals, Inc., Allentown, PA (US)

( * ) Notice: Subject to any disclaimer, the term of this patent is extended or adjusted under 35 U.S.C. 154(b) by 406 days.

(21) Appl. No.: 12/257,950

(22) Filed: Oct. 24, 2008

(65) Prior Publication Data
US 2010/0101448 A1    Apr. 29, 2010

(51) Int. Cl.
  B24D 3/02    (2006.01)
  C09G 1/02    (2006.01)

(52) U.S. Cl.
  USPC ............... 51/308; 51/307; 51/309; 106/3

(58) Field of Classification Search
  USPC ............................... 51/307–309; 106/3
  See application file for complete search history.

(56) References Cited

U.S. PATENT DOCUMENTS

| | | | |
|---|---|---|---|
| 4,552,568 A * | 11/1985 | Igarashi et al. | 44/280 |
| 4,687,490 A * | 8/1987 | Heaton et al. | 44/280 |
| 5,266,088 A * | 11/1993 | Sandusky et al. | 51/298 |
| 5,770,095 A | 6/1998 | Sasaki et al. | |
| 6,126,853 A | 10/2000 | Kaufman et al. | |
| 6,309,560 B1 | 10/2001 | Kaufman et al. | |
| 6,315,803 B1 | 11/2001 | Ina et al. | |
| 6,372,632 B1 | 4/2002 | Yu et al. | |
| RE37,786 E | 7/2002 | Hirabayashi et al. | |
| 6,485,355 B1 | 11/2002 | Economikos et al. | |
| 6,561,876 B1 | 5/2003 | Tateyama et al. | |
| 6,620,215 B2 * | 9/2003 | Li et al. | 51/298 |
| 6,660,639 B2 | 12/2003 | Li et al. | |
| 6,720,264 B2 | 4/2004 | Sahota et al. | |
| 6,758,872 B2 | 7/2004 | Ota et al. | |
| 6,773,476 B2 * | 8/2004 | Sakai et al. | 51/307 |
| 6,777,337 B2 | 8/2004 | Yasui et al. | |
| 6,814,767 B2 | 11/2004 | Hirano | |
| 6,821,897 B2 | 11/2004 | Schroeder et al. | |
| 6,866,792 B2 | 3/2005 | Small et al. | |

(Continued)

FOREIGN PATENT DOCUMENTS

| JP | 59176394 | * 10/1984 |
|---|---|---|
| JP | 61223093 | * 10/1986 |

OTHER PUBLICATIONS

Gendy et al.; Adsorption of Ethoxylated Alkyl phenol-Formaldehyde Polymeric Surfactants at the Aqueous Solution-Air Interface; Polymer International 33 (1994) 247-252.*

(Continued)

Primary Examiner — Shuangyi Abu Ali
(74) Attorney, Agent, or Firm — Lina Yang

(57) ABSTRACT

A slurry for use in a chemical mechanical planarization process for a wafer comprises a chemical portion and a mechanical portion. The chemical portion comprises a surfactant that forms a layer over a metallic layer of the wafer to decreasing dishing to less than an average of 843 Å reduce the static etch rate of the metallic layer. The mechanical portion comprises an abrasive agent to assist in the planarization of the metallic layer of the wafer. In another embodiment, a slurry for polishing a copper layer formed over a first layer is disclosed. The slurry comprises an abrasive agent; and a surfactant comprising at least one non-ionic surfactant to reduce the static etch rate of the copper layer. The shelf life of the slurry exceeds 90 days.

27 Claims, 1 Drawing Sheet

(56) References Cited

U.S. PATENT DOCUMENTS

| | | |
|---|---|---|
| 6,899,821 B2 | 5/2005 | Uchida et al. |
| 6,936,543 B2 | 8/2005 | Schroeder et al. |
| 6,974,777 B2 | 12/2005 | Moeggenborg et al. |
| 7,022,255 B2 | 4/2006 | Siddiqui et al. |
| 7,118,685 B1 * | 10/2006 | Yoneda et al. ............... 252/79.1 |
| 7,118,686 B2 | 10/2006 | Sinha et al. |
| 7,153,335 B2 | 12/2006 | Siddiqui et al. |
| 7,232,529 B1 | 6/2007 | Uchida et al. |
| 7,300,603 B2 | 11/2007 | Liu |
| 7,319,072 B2 | 1/2008 | Kurata et al. |
| 7,381,648 B2 | 6/2008 | Kaufman et al. |
| 2002/0025762 A1 * | 2/2002 | Luo et al. ........................ 451/41 |
| 2003/0098434 A1 | 5/2003 | Li et al. |
| 2004/0244300 A1 * | 12/2004 | Ichiki et al. ..................... 51/307 |
| 2004/0248415 A1 | 12/2004 | Wada et al. |
| 2004/0266323 A1 * | 12/2004 | Oshima et al. .................. 451/41 |
| 2005/0056368 A1 | 3/2005 | Schroeder et al. |
| 2005/0178742 A1 | 8/2005 | Chelle et al. |
| 2005/0284844 A1 | 12/2005 | Hattori et al. |
| 2006/0042502 A1 | 3/2006 | Sato et al. |
| 2006/0117667 A1 | 6/2006 | Siddiqui et al. |
| 2006/0124593 A1 | 6/2006 | Moyaerts et al. |
| 2006/0240672 A1 | 10/2006 | Yoneda et al. |
| 2006/0270235 A1 | 11/2006 | Siddiqui et al. |
| 2006/0289034 A1 | 12/2006 | Small et al. |
| 2006/0289387 A1 | 12/2006 | Lombardi |
| 2007/0004210 A1 | 1/2007 | Takemiya et al. |
| 2007/0045266 A1 | 3/2007 | Sandberg et al. |
| 2007/0075292 A1 | 4/2007 | Mahulikar et al. |
| 2007/0117394 A1 | 5/2007 | Shinoda et al. |
| 2007/0219104 A1 | 9/2007 | Grumbine et al. |
| 2007/0254964 A1 | 11/2007 | Mahulikar et al. |
| 2008/0029126 A1 | 2/2008 | Thomas |
| 2008/0032505 A1 | 2/2008 | Kawamura et al. |
| 2008/0057716 A1 | 3/2008 | Yamashita |
| 2008/0104893 A1 | 5/2008 | Oh |
| 2008/0121839 A1 | 5/2008 | Park et al. |
| 2008/0148652 A1 | 6/2008 | Siddiqui |

OTHER PUBLICATIONS

Gregory B. Shinn et al, Chemical-Mechanical Polish, Handbook of Semiconductor Mfg. Tech., 2000, pp. 415-460.

D. Zeidler et al, Characterization of Cu Chemical Mechanical Polishing by Electrochemical Investigations, Micro. Engrg. 33, 1997, pp. 259-265.

Ronald J. Gutmann et al, Chemical-Mechanical Polishing of Copper With Oxide and Polymer Interlevel Dielectrics, Thin Solid Films 270 (1995) pp. 596-600.

* cited by examiner

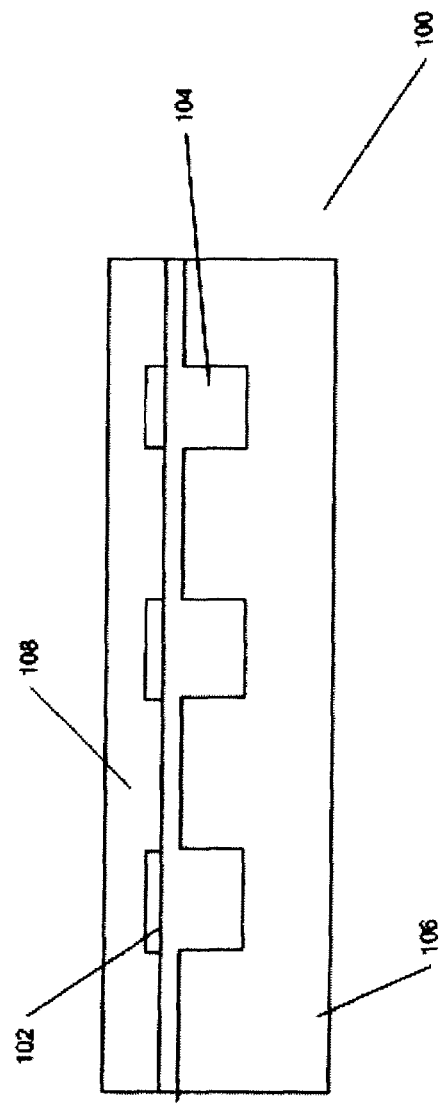

POLISHING SLURRY FOR COPPER FILMS

BACKGROUND OF THE INVENTION

The present invention relates to the field of slurries for use in chemical mechanical polishing (planarization) CMP of metal films of semiconductor wafers and, more specifically to a polishing slurry for copper films.

The use of chemical mechanical planarization (CMP) in semiconductor manufacturing is well known to those of skill in the art. For example, CMP processing can be used to remove excess metal, such as copper, used to form interconnects, vias and lines. In one embodiment, the copper layer is formed over a dielectric layer such as a silicon dioxide layer. In another embodiment a barrier layer is formed between the silicon dioxide layer and the copper layer.

In a typical CMP process, a substrate (wafer) having, for example, a copper layer formed over a dielectric layer, is placed in contact with a rotating polishing pad attached to a platen. A CMP slurry, comprising an abrasive and chemically reactive mixture, is supplied to the pad during the CMP process. During the CMP process, the pad and substrate are rotated while downward pressure is applied by the pad against the wafer. The CMP slurry assists in the planarization of the wafer by chemically and mechanically interacting with films on the wafer as the pad moves relative to the wafer.

When the pad is not moving over the wafer, the chemical components of the CMP slurry can continue to remove films on the substrate. For example, copper can be dissolved by the chemical components of the CMP slurry absent any mechanical action by the polishing pad or slurry's abrasive. The removal rate of copper in the absence of any mechanical action is known as the static etch rate of copper. A large static etch rate can lead to problems such as the uneven removal of copper formed on the wafer such as copper trenches and copper vias. This uneven removal is known as dishing. A related problem is erosion, where excess material of the dielectric layer and the copper layer are removed.

Various slurries for the CMP of copper have been disclosed. For example, U.S. Pat. No. 6,396,543, entitled "CMP Method Utilizing Amphiphilic Nonionic Surfactants", which issued on Aug. 30, 2005 to Schroeder et al., discloses a slurry that includes an amphiphilic nonionic surfactant which is said to reduce dishing. The slurry of this patent is said to decrease dishing to around 1500 Å) for a 100 μm region. While this represents an improvement in dishing, it is still unacceptably high.

Accordingly, it is desired to provide a CMP slurry that has a low static etch rate to help minimize dishing and erosion. Furthermore, the desirable features and characteristics of the present invention will be apparent from the subsequent detailed description and the appended claims, taken in conjunction with the accompanying drawings and the foregoing technical field and background.

BRIEF SUMMARY OF THE INVENTION

In one embodiment, a slurry for use in a chemical mechanical planarization process for a wafer comprises a chemical portion and a mechanical portion. The chemical portion comprises a surfactant that forms a layer over a metallic layer of the wafer to reduce the static etch rate of the metallic layer. The mechanical portion comprises an abrasive agent to assist in the planarization of the wafer in the metallic layer. The array dishing of a 100 by 100 μm array is less than an average of 843 Å.

In another embodiment, a slurry for polishing a copper layer formed over a first layer is disclosed. The slurry comprises an abrasive agent and a surfactant, which comprises at least one non-ionic surfactant to reduce the static etch rate of the copper layer. The shelf life of the slurry exceeds 90 days.

In another embodiment, a slurry for use in the chemical mechanical planarization of copper on a wafer is disclosed. The slurry comprises glycine, 1,2,4 triazole, high purity colloidal $SiO_2$ and a surfactant forming a layer over the copper film.

BRIEF DESCRIPTION OF THE DRAWING

FIG. 1 is a cutaway view of a semiconductor substrate in accordance with the teachings of the present invention, wherein like numerals denote like elements.

DETAILED DESCRIPTION OF THE INVENTION

The following detailed description of the invention is merely exemplary in nature and is not intended to limit the invention or the application and uses of the invention. Furthermore, there is no intention to be bound by any theory presented in the preceding background of the invention or the following detailed description of the invention.

In an exemplary embodiment of the present invention, the polishing slurry for CMP processing in the present invention is useful for polishing copper films or layers formed over a dielectric film or layer or over a barrier film or layer formed over a dielectric film or layer. For the purpose of this patent, a copper layer formed over a substrate may include one or more layers between the copper layer and the substrate such as a barrier layer and/or dielectric layers. In the present invention, the slurries may be described as concentrated slurries, that is, slurries without an oxidizer. Typically, slurries are manufactured in a concentrated form and the oxidizer, such as $H_2O_2$, is added prior to use.

In one exemplary embodiment of the present invention, a CMP slurry comprises a chemical portion and a mechanical portion. In one exemplary embodiment, the chemical portion can include, but is not limited to, one or more surfactants, a corrosion inhibitor and a chelating (etching) agent. In one exemplary embodiment, the mechanical portion can include, but is not limited to, an abrasive agent.

Considering the chemical portion first, the corrosion inhibitor can be any chemical that helps to reduce the static etch rate by inhibiting corrosion of a metal, such as copper, in the absence of mechanical polishing. In the present invention, the corrosion inhibitor helps to inhibit corrosion of copper by forming an oxide layer on the copper film in the absence of mechanical polishing. In one exemplary embodiment, the corrosion inhibitor is triazole. In one exemplary embodiment, the corrosion inhibitor is 1,2,4 triazole. Other corrosion inhibitors known in the art can also be used.

The chelating (etching) agent can be any chemical agent that reacts with and removes, in one exemplary embodiment, copper in both the absence of and during mechanical polishing. In one exemplary embodiment, glycine is used as the chelating agent. Other chelating agents known in the art can also be used including EDTA and the like.

In an exemplary embodiment of the present invention the surfactant or surfactants can be an ionic, cationic, anionic or non-ionic polymeric or monomeric surfactant. In an exemplary embodiment of the present invention, the surfactant or surfactants are selected to help decrease the static etch rate. As discussed previously, this will reduce dishing and erosion. In the present invention, the surfactants chosen form a film or layer over the dielectric and copper metal in the absence of mechanical polishing. This situation is illustrated in FIG. 1. FIG. 1 is a cross-section of a wafer 100 showing a copper oxide layer 102 formed over a copper layer 104 deposited on a dielectric layer 106. The surfactant layer 108 lays over the dielectric layer 106 and the copper layer 104. In the absence of mechanical polishing, the surfactant layer 108 will reduce the static etch rate of both the copper layer 104 and the dielectric layer 106.

In addition, the surfactant coats and lubricates the abrasive particles to reduce the hardness of the particles. Reducing the hardness of the particles helps to prevent damage to the dielectric layer. This is advantageous when the porous dielectrics are used to decrease the k-value of the dielectric as porous dielectrics tend to be brittle. The reduced hardness of the particles helps to facilitate mechanical polishing of the dielectric layer without damage to the dielectric layer.

Recently, porous dielectrics have been introduced in order to achieve greater miniaturization of microelectronic structures. Porous dielectrics tend to have a smaller dielectric, or K value. For example, in one embodiment, the K-value for a low K dielectric is less than 2.75. While it is advantageous to decrease the K value of the dielectric, a drawback of porous dielectrics is that ions and molecules can be absorbed into the structure of porous dielectric. In the present invention, this can be reduced or stopped in the absence of mechanical polishing as the surfactant layer prevents materials from being absorbed into porous dielectric structure. In one exemplary embodiment the surfactant is selected based on the size and molecular weight of the surfactant such that the molecules of the surfactant do not diffuse into the pores of the dielectric and block other ions and molecules from diffusing into the dielectric as well.

In one exemplary embodiment, the surfactant is polyethylene glycol, ethylene containing polymers, glycols, 1,2 ethanediol, polyethylene oxide and derivatives thereof, An example of such a surfactant is Polyglykol CL 14000S. In another exemplary embodiment, the surfactant is hydrocarbon polymers, aromatics, polyethylene and derivatives thereof. An example of such a surfactant is Solsperse 46000. In another exemplary embodiment the surfactant is alkoxylated alcohol, tridecyl alcohol and derivatives thereof. An example of such a surfactant is Lutensol TDA6. In yet another exemplary embodiment, the surfactant is phenol-type, alkyl phenol, alkyl phenol formaldehyde and derivatives thereof. An example of such a surfactant is Dispersogen 2774.

In another exemplary embodiment, the surfactant can be a cyclic or heterocyclic compound having the formula $A_x(R_3)B_y(R_2)C_z(R_3)$ or $-A_x(R_2)B_y(R_2)C_z(R_2)$ — wherein A, B and C are individually O,S,P,N,C, and where each R is individually O,S,P,N,C,H and where x, y and z are integer values from 0 to 10,000. In one exemplary embodiment, a combination of surfactants can be used.

Other chemicals may also be included as part of the chemical portion of the slurry. For example, a stabilizing agent can be added to adjust the pH of the slurry. In one exemplary embodiment of the present invention, the pH is maintained near neutral by the addition of potassium hydroxide (KOH). In other exemplary embodiments of the present invention, the pH range may vary from neutral depending on the needs of the end user.

Biocides can also be added to help prevent the formation of microbes in the slurry, thereby increasing the shelf life of the slurry. Biocides can be any biocide, fungicide, anti-microbial agent and the like, which can be added to the slurry to increase the shelf life of the slurry. The shelf life of the slurry is the amount of time a slurry can be stored without a change in performance. The shelf life measures the life of the slurry before the addition of an oxidizer such as $H_2O_2$. The useful life of a slurry after the addition of an oxidizer is known as the pot life. In one exemplary embodiment, the biocide is KATHON CG, 5-chloro-2-methyl-thiazol-3-one; 2-methylthiazol-3-one, manufactured by Rohm and Haas of Philadelphia, Pa., although other biocides that are compatible with the slurry composition and which enhance the shelf life of the slurry can be used.

In the present invention, the slurry, through the addition of the biocides and the use of one or more surfactants, has a shelf life (the life before the addition of an oxidizer such as $H_2O_2$) of at least 90 days. The CMP process performance of a slurry over its shelf life remains essentially unchanged during that shelf life.

The mechanical portion of the slurry includes an abrasive agent. The abrasive agent can be any particulate abrasive that will assist in the removal of films during the CMP process. In one exemplary embodiment, the abrasive agent can be a high-purity colloidal silicon dioxide ($SiO_2$) particle. High-purity in this context indicates a low level of metallic and/or other contaminants versus typical colloidal $SiO_2$. Typical colloidal $SiO_2$ derived from mined sources can have significant metallic contamination, which can have a deleterious effect on wafer fabrication. In an exemplary embodiment, the concentration of $SiO_2$ is from 0.01 weight percent to 5 weight percent.

As discussed previously, in one exemplary embodiment of the present invention, the abrasive is high-purity colloidal silicon. The high purity is based on the lack of contaminants in the colloidal silicon. In the table below, colloidal silicon used in prior art slurries, known as Poliedge 2002 and manufactured by Grace Chemical Company of Columbia, Md., is compared with a colloidal silicon used in an exemplary embodiment of the present invention, PL-3, which is a manufactured $SiO_2$, manufactured by Fuso Chemical Company, Ltd. of Osaka, Japan. As can be seen in the table, the high purity silicon dioxide has significantly less impurities than prior art silicon dioxide abrasives.

TABLE I

IMPURITIES IN ABRASIVE AGENTS

|  | PRIOR ART Poliedge 2002 | EXEMPLARY EMBODIMENT Fuso PL-3 |
|---|---|---|
| Al (ppb) | 48,320 | <5 |
| Ca (ppb) | 2,880 | 5 |
| Co (ppb) | 15 | <5 |
| Cr (ppb) | 880 | <5 |
| Cu (ppb) | 22 | <5 |
| Fe (ppb) | 14,090 | <5 |
| Mg (ppb) | 5,170 | <5 |
| Mn (ppb) | 111 | <5 |
| Ni (ppb) | 77 | <10 |
| K (ppb) | 3,840 | 99 |
| Na (ppb) | 1,213,500 | 63 |
| Ti (ppb) | 41,530 | 47 |
| Zn (ppb) | <10 | <5 |
| Zr (ppb) | 19,950 | <2 |

As can be seen in the table, the high-purity silicon used in accordance with the teachings of the present invention has less than 100 ppb of any given contaminant and less than 5 ppb for many contaminants.

In one exemplary embodiment, the abrasive agent used in the present invention is derived from manufactured silicon dioxide. In an exemplary embodiment, the colloidal silicon has a mean particle size of less than 95 nm. In another exemplary embodiment, the colloidal silicon has a mean particle size of less than 90 nm. In yet another exemplary embodiment, the colloidal silicon has a mean particle size of approximately 84.7 nm with a particle size with a standard deviation of 37.35 nm as measured using light scattering techniques. Thus, the standard deviation is almost one-third the mean particle size. As is well known in the art, the larger the standard deviation, the greater the distribution of values, or in this case, the greater the distribution of particle sizes. Assuming the particles are normally distributed, 68 percent of all of all particles are between 47.35 nm and 123.1 nm. This represents a smaller particle size and wider distribution of particle size over previous colloidal silicon. For example, Poliedge 2002, colloidal silicon used in previous slurries, has a mean particle size of 96.1 nm and a standard deviation of 27.96 nm. The combination of a smaller mean particle size and a wide distribution of particle sizes help to reduce the scratching and other defects on the surface of the wafer during CMP processing.

The slurry mixture as described above is a concentrated slurry. An oxidizer is added to the slurry, typically at the customer site. The oxidizer in this exemplary embodiment is $H_2O_2$. In an exemplary embodiment, the oxidizer can be per-type oxidizers including but not limited to peroxides, nitrates, nitrites, perchlorates, chlorates, chlorites, hypochlorites, dichromates, permanganates and persulfates.

The following examples show formulation of slurries in accordance with the teaching of the present invention as well as the results of a previous known formulation. In the following examples, test wafers were polished at downward forces of 3 psi and 1 psi to determine removal rate of copper in angstroms per minute. Also, dishing was tested by polishing a test wafer and measuring dishing in a 100×100 μm array of copper at the center, middle and edge of the array, as well as determining an average of dishing. The dishing is expressed in Angstroms (Å).

EXAMPLE 1 (COMPARATIVE)

For comparative purposes a slurry without surfactants and with regular colloidal silicon dioxide was prepared as follows with no pH adjustment:

| Component | Amount (wt %) |
|---|---|
| Glycine | .630054 |
| 1,2,4 triazole | .0315 |
| $SiO_2$ | .006264 |
| Kathon | .000174006 |
| $H_2O_2$ | 1 |

In this example, the $SiO_2$ particles are not high purity $SiO_2$ particles. The $SiO_2$ particles are commercially available as Poliedge 2002, manufactured by Grace Chemical Company.

The test results for this comparative formulation were:

| Removal Rate (Å/min) | |
|---|---|
| Downward Pressure | Removal Rate |
| 3 psi rate | 8141 |
| 1 psi rate | 2737 |

| Dishing Array (Å) (100 × 100 μm) | |
|---|---|
| Wafer Portion | Å |
| Center | 1218 |
| Middle | 1304 |
| Edge | 1332 |
| Average | 1285 |

EXAMPLE 2 (COMPARATIVE)

For comparative purposes a slurry without surfactants but with high purity colloidal silicon dioxide (in this example, PL-3 was used as discussed previously) was prepared as follows with pH adjustment:

| Component | Amount (wt %) |
|---|---|
| Glycine | .630054 |
| 1,2,4 Triazole | .0315 |
| $SiO_2$ | .006264 |
| Kathon CG | .000174006 |
| KOH | .08 |
| $H_2O_2$ | 1 |

The slurry was adjusted to a pH of 7.00. The test results were:

| Removal Rate (Å/Min) | |
|---|---|
| Downward Pressure | Removal Rate |
| 3 psi rate | 7566 |
| 1 psi rate | 2941 |

| Dishing Array (Å) (100 × 100 μm) | |
|---|---|
| Wafer Portion | Å |
| Center | 815 |
| Middle | 834 |
| Edge | 1296 |
| Average | 932 |

EXAMPLE 3

In the following example, a non-ionic polymeric surfactant was added to the formulation of Example 2. In this example, the surfactant was Solsperse 46000 manufactured by Lubizol of Cleveland, Ohio. The silicon dioxide used was the PL-3 silicon dioxide. The formulation in this example is:

| Component | Weight % |
|---|---|
| Glycine | .630054 |
| Triazole | .0315 |
| $SiO_2$ | .006264 |
| Kathon CG | .000174006 |
| Solsperse 46000 | .045 |
| KOH | .08 |
| $H_2O_2$ | 1 |

The pH was set at 7.0. The results are:

| Removal Rate (Å/Min) | |
| --- | --- |
| Downward Pad Pressure | Removal Rate (Å/min) |
| 3 psi | 5991 |
| 1 psi | 2231 |

| Dishing Array (Å) (100 × 100 μm) | |
| --- | --- |
| Wafer position | Å |
| Center | 658 |
| Middle | 886 |
| Edge | 986 |
| Average | 843 |

EXAMPLE 4

In the following example, a non-ionic polymeric surfactant was added to the formulation of Example 2. In this example, the surfactant was Polyglykol manufactured by Clairant Chemical of North Carolina. The silicon dioxide used was the PL-3 silicon dioxide. The formulation in this example is:

| Component | Weight % |
| --- | --- |
| Glycine | .630054 |
| Triazole | .0315 |
| $SiO_2$ | .006264 |
| Kathon CG | .000174006 |
| Polyglykol | .015 |
| KOH | .08 |
| $H_2O_2$ | 1 |

The pH was set at 7.0. The results are:

| Removal Rate (Å/Min) | |
| --- | --- |
| Downward Pad Pressure | Removal Rate (Å/min) |
| 3 psi | 7213 |
| 1 psi | 2950 |

| Dishing Array (Å) (100 × 100 μm) | |
| --- | --- |
| Wafer position | Å |
| Center | 359 |
| Middle | 456 |
| Edge | 833 |
| Average | 549 |

EXAMPLE 5

In the following example, a non-ionic polymeric surfactant and a non-ionic monomeric surfactant was added to the formulation of Example 2. In this example, the polymeric surfactant was Polyglykol and the monomeric surfactant was Lutensol TDA-6, manufactured by BASF of Mount Olive, N.J. The silicon dioxide used was the PL-3 silicon dioxide. The formulation in this example is:

| Component | Weight % |
| --- | --- |
| Glycine | .630054 |
| Triazole | .0315 |
| $SiO_2$ | .006264 |
| Kathon CG | .000174006 |
| Polyglykol | .01 |
| Lutensol TDA-6 | .0225 |
| KOH | .08 |
| $H_2O_2$ | 1 |

The pH was set at 7.0. The results are:

| Removal Rate (Å/Min) | |
| --- | --- |
| Downward Pad Pressure | Removal Rate (Å/min) |
| 3 psi | 7470 |
| 1 psi | 2302 |

| Dishing Array (Å) (100 × 100 μm) | |
| --- | --- |
| Wafer position | Å |
| Center | 569 |
| Middle | 393 |
| Edge | 986 |
| Average | 649 |

EXAMPLE 6

In the following example, a non-ionic polymeric surfactant was added to the formulation of Example 2. In this example, the surfactant was Dispersogen 2774 manufactured by Clairant Chemical of North Carolina. The silicon dioxide used was the PL-3 silicon dioxide. The formulation in this example is:

| Component | Weight % |
| --- | --- |
| Glycine | .630054 |
| Triazole | .0315 |
| SiO2 | .006264 |
| Kathon CG | .000174006 |
| Dispersogen | .045 |
| KOH | .08 |
| H2O2 | 1 |

The pH was set at 7.0. The results are:

| Removal Rate (Å/Min) | |
| --- | --- |
| Downward Pad Pressure | Removal Rate (Å/min) |
| 3 psi | 7267 |
| 1 psi | 3015 |

| Dishing Array (Å) (100 × 100 μm) | |
| --- | --- |
| Wafer position | Å |
| Center | 426 |
| Middle | 235 |
| Edge | 934 |
| Average | 532 |

EXAMPLE 7

This example was the same as Example 6, except a higher level of Dispersogen (0.07) with the results as follows:

| Downward Pad Pressure | Removal Rate (Å/min) |
|---|---|
| 3 psi | 7435 |
| 1 psi | 3241 |

| Dishing Array (Å) (100 × 100 μm) | |
|---|---|
| Wafer position | Å |
| Center | 331 |
| Middle | 381 |
| Edge | 819 |
| Average | 510 |

As can be seen in the above table, this example produced the best results for dishing.

Thus, as can be seen from the examples, the addition of certain surfactants, in conjunction with high-purity colloidal silicon dioxide, results in low dishing rates. In general, in an exemplary embodiment, the slurry comprises:

| Chemical | exemplary target wt. % | wt. % range |
|---|---|---|
| Glycine | .630054 | 0.01-5.0% |
| Colloidal SiO$_2$ | 62.64 ppm | 0.01-5.0% |
| Kathon | 1.74 ppm | 0.0-5.0% |
| 1,2,4 Triazole | .0315 | 0.01-1.0% |
| KOH | 0.6 | 0.01-2.0% |
| Solsperse 46000 | 0.045 | 0.01-5.0% |
| Polyglycol | 0.015 | 0.01-5.0% |
| Lutensol TDA-6 | 0.015 | 0.01-5.0% |
| Dispersogen 2774 | 0.045 or 0.07 | 0.01-5.0% |

In the table above, one or more of the surfactants can be chosen for use in the slurry. Water is also added to the slurry to achieve a weight percentage of one-hundred percent.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims.

The invention claimed is:

1. A slurry for use in a chemical mechanical planarization process for a wafer comprising:
a chemical portion comprising a surfactant that forms a layer over a metallic layer of the wafer to decrease dishing to less than an average of 843 Å; and,
a mechanical portion comprising an abrasive agent to assist in the planarization of the metallic layer of the wafer, wherein the surfactant is a non-ionic alkyl phenol formaldehyde surfactant and the abrasive agent is a high-purity colloidal SiO$_2$ having a concentration of any one contaminant of less than 100 ppb.

2. The slurry of claim 1 further comprising a corrosion inhibitor, an etching agent, a biocide, a pH balancer, and an oxidizer.

3. The slurry of claim 2 wherein the corrosion inhibitor is 1,2,4 triazole.

4. The slurry of claim 2 wherein the etching agent is glycine.

5. The slurry of claim 2 wherein the biocide is 5-chloro-2-methyl-thiazol-3-one; 2-methylthiazol-3-one.

6. The slurry of claim 2 wherein the pH balancer is KOH.

7. The slurry of claim 2 wherein the oxidizer is one or more oxidizers selected from the group consisting of peroxides, nitrates, nitrites, perchlorates, chlorates, chlorites, hypochlorites, dichromates, permanganates and persulfates.

8. The slurry of claim 1 wherein the dishing is less than an average of 510 Å.

9. The slurry of claim 1 wherein the dishing is less than an average of 410 Å.

10. The slurry of claim 1 wherein the surfactant concentration is 0.01 to 5.0 percent by weight.

11. The slurry of claim 1 wherein the mean particle size of the abrasive agent is less than 95 nm.

12. The slurry of claim 1 wherein the abrasive agent concentration is 0.1 to 5.0 percent by weight.

13. The slurry of claim 1 wherein the pH of the slurry is adjusted to 6.0-8.0 using KOH.

14. A slurry for the chemical mechanical planarization of a copper layer formed over a first layer, the slurry comprising;
an abrasive agent; and
a surfactant comprising at least one non-ionic surfactant to reduce the static etch rate of the copper layer, wherein the surfactant is a non-ionic alkyl phenol formaldehyde surfactant wherein the surfactant is a non-ionic alkyl phenol formaldehyde surfactant and the abrasive agent is a high-purity colloidal SiO$_2$ having a concentration of an one contaminant of less than 100 ppb; and
wherein the slurry has a shelf life in excess of 90 days.

15. The slurry of claim 14 wherein the slurry comprises 0.01 to 5.0 weight percent of SiO$_2$.

16. The slurry of claim 14 further comprising a corrosion inhibitor, an etching agent, a biocide, a pH balancer, and an oxidizer.

17. The slurry of claim 16 wherein the corrosion inhibitor is 1,2,4 triazole.

18. The slurry of claim 16 wherein the etching agent is glycine.

19. The slurry of claim 16 wherein the biocide is 5-chloro-2-methyl-thiazol-3-one;2-methylthiazol-3-one.

20. The slurry of claim 16 wherein the pH balancer is KOH.

21. The slurry of claim 16 wherein the oxidizer is H$_2$O$_2$.

22. The slurry of claim 16 wherein the oxidizer is one or more oxidizers selected from the group consisting of peroxides, nitrates, nitrites, perchlorates, chlorates, chlorites, hypochlorites, dichromates, permanganates and persulfates.

23. A slurry for use in the chemical mechanical planarization of a copper film on a wafer, the slurry comprising:
a. glycine;
b. 1,2,4 triazole;
c. high-purity colloidal SiO$_2$ having a concentration of any one contaminant of less than 100 ppb; and
d. a surfactant operable to form a layer over the copper film in the absence of mechanical polishing to decrease the static etch rate of the copper film, wherein the surfactant is a non-ionic alkyl phenol formaldehyde surfactant.

24. The slurry of claim 23 wherein the surfactant concentration is 0.01 to 5.0 percent by weight.

25. The slurry of claim 23 wherein a mean particle size of the colloidal $SiO_2$ is less than 95 nm.

26. The slurry of claim 23 wherein the standard deviation of the mean particle size of the colloidal $SiO_2$ is more than one-third of the mean particle size.

27. The slurry of claim 23 wherein the colloidal $SiO_2$ concentration is 0.1 to 5.0 percent by weight.

* * * * *